United States Patent [19]
Nishida et al.

[11] Patent Number: 6,052,168
[45] Date of Patent: Apr. 18, 2000

[54] ACTIVE MATRIX LIQUID-CRYSTAL DISPLAY WITH VERTICLE ALIGNMENT, POSITIVE ANISOTROPY AND OPPOSING ELECTRODES BELOW PIXEL ELECTRODE

[75] Inventors: Shinichi Nishida; Hiroaki Matsuyama, both of Tokyo, Japan

[73] Assignee: NEC Corporation, Tokyo, Japan

[21] Appl. No.: 09/195,618

[22] Filed: Nov. 19, 1998

[30] Foreign Application Priority Data

Nov. 20, 1997 [JP] Japan ................................. 9-320121

[51] Int. Cl.[7] ................................................ G02F 1/1343
[52] U.S. Cl. .......................... 349/141; 349/177; 349/130
[58] Field of Search .................................. 349/141, 177, 349/130, 139

[56] References Cited

U.S. PATENT DOCUMENTS 5,946,060  8/1999  Nishiki et al. ........................ 349/141

FOREIGN PATENT DOCUMENTS

| 56-88179 | 7/1981 | Japan . |
| 57-618 | 1/1982 | Japan .......................... 349/FOR 129 |
| 59-7367 | 2/1984 | Japan . |
| 6-160878 | 6/1994 | Japan . |
| 10-26765 | 1/1998 | Japan . |
| 10-186351 | 7/1998 | Japan . |

*Primary Examiner*—Kenneth Parker
*Attorney, Agent, or Firm*—Sughrue, Mion, Zinn, Macpeak & Seas, PLLC

[57] ABSTRACT

Disclosed is an active matrix liquid-crystal display, which has: two transparent insulative substrates, either one of which having a plurality of scanning lines, a plurality of signal lines formed in the direction of intersecting with the plurality of scanning lines, a plurality of switching elements disposed on the intersection points of the plurality of scanning lines and the plurality of signal lines, and pixel electrodes connected to the plurality of switching elements; a liquid crystal sandwiched between the two transparent insulative substrates; polarizing plates disposed outside the two transparent insulative substrates; and linear opposing electrodes formed, through insulating film, under the pixel electrodes with a width greater than that of the pixel electrode; wherein the liquid crystal has positive permittivity anisotropy and is oriented nearly perpendicularly to the transparent insulative substrates, the pixel electrode is composed of single or a plurality of linear electrodes, and the direction of the liquid crystal is controlled by electric field to be formed between the pixel electrode and the opposing electrode.

8 Claims, 9 Drawing Sheets

ACTIVE MATRIX LIQUID-CRYSTAL DISPLAY WITH VERTICLE ALIGNMENT, POSITIVE ANISOTROPY AND OPPOSING ELECTRODES BELOW PIXEL ELECTRODE

FIELD OF THE INVENTION

This invention relates to a liquid-crystal display, and more particularly to, an active matrix liquid-crystal display using lateral electric field drive system.

BACKGROUND OF THE INVENTION

An active matrix liquid-crystal display (AMLCD) where thin film field-effect transistor (TFT) is used as a switching element of pixel has a high image quality, and is wide used as a display device of portable computer or recently a monitor for space-saving type desktop computer.

Recently, for the purpose of enhancing the view angle characteristic, a display system using the lateral electric field is proposed. This system is, for example, disclosed in Japanese patent application laid-open No. 6-160878 (1994). In this system, a pixel electrode and an opposing electrode are formed parallel on a same substrate, a voltage is applied between them to form parallel field on the surface of the substrate, thereby the direction of anisotropic axis (liquid-crystal director) of liquid crystal (hereinafter also referred to as 'LC') is varied, thereby the amount of transmitted light is controlled.

In this LC display system, where LC director moves only approximately parallel to the in-plane of the substrate, there does not occur the problem that, as in case of TN mode, the relationship between the amount of transmitted light and applied voltage is greatly changed between when viewing in the direction of LC director and when viewing in the direction of normal line of LC layer. Thus, it has the characteristic that nearly similar images can be obtained in a very wide view angle.

However, in this display mode, there are the problems that the response speed is lower than that of other modes and an image in movie display is not so good, because the twist transformation of LC mainly occurs therein.

Figure 1:
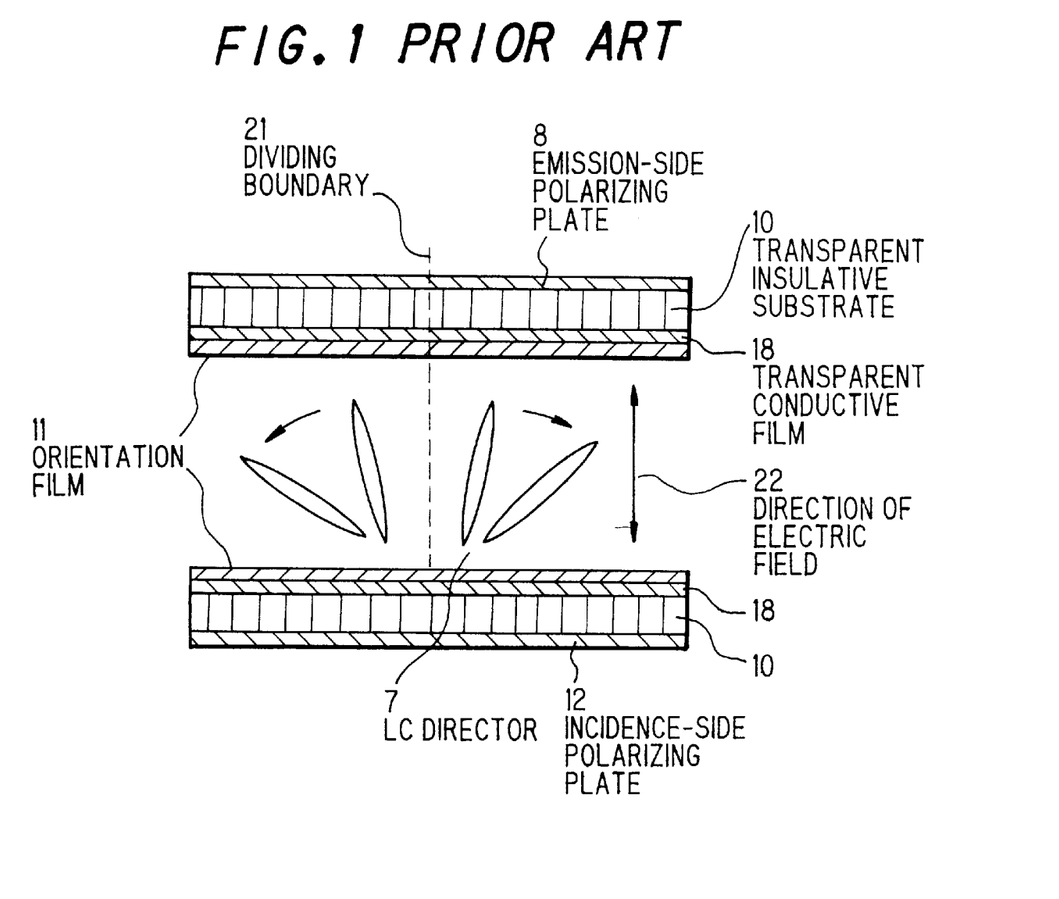
FIG. 1 is a cross sectional view showing a conventional active matrix liquid-crystal display.

Also, as shown in FIG. 1, a method where LC with negative permittivity anisotropy is vertically oriented and switching of pixel is conducted by applying a voltage between transparent electrodes 18 formed sandwiching LC so as to incline LC director 7 is proposed (e.g., 1997 SID International Symposium Digest of Technical Papers, p.845).

Meanwhile, in FIG. 1, 7 is a LC director, 8 is an emission-side polarizing plate, 10 is a transparent insulative substrate, 11 is orientation film, 12 is an incidence-side polarizing plate, 18 is transparent conductive film, and 21 is a dividing boundary.

In using such vertical orientation, though it is known that the response speed of LC is enhanced, there is the problem that the inversion of tone occurs when viewing obliquely in the inclined direction of LC in the case that the entire surface of LC is uniformly oriented and is inclined in one direction. Therefore, in using this method to get the wide view angle, it is necessary to divide the inclining direction of LC into several directions to be determined within one pixel.

Thus, to divide the inclining direction of LC within pixel by vertical field, it is necessary to form orientation state where LC is slightly inclined in several directions determined in the initial orientation state. Thereby, when applying vertical field, LC director can be inclined with more amount of inclination, therefore controlling the inclination direction into several directions.

As means for achieving this, for example, a method where the rubbing direction of the orientation film 11 is varied within pixel is proposed. However, it generally causes an increase in process. Also, LC materials with negative permittivity anisotropy necessary to compose this are limited, therefore the reliability and the working temperature range are questionable.

Figure 2:
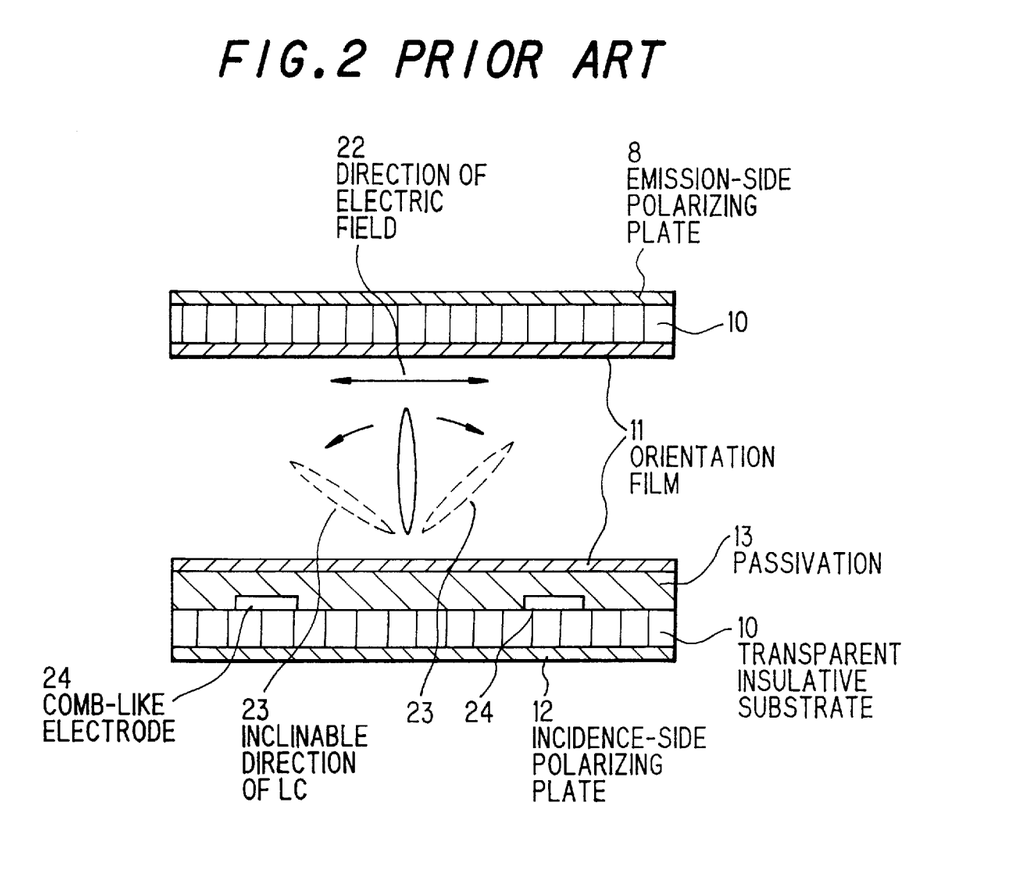
FIG. 2 is a cross sectional view showing another conventional active matrix liquid-crystal display.

As a method for solving the problem of vertical orientation, Japanese patent publication No. 59-7367 (1984) discloses the method that, as shown in FIG. 2, LC with positive permittivity anisotropy is vertically oriented and LC director 7 is inclined by applying lateral field through comb-like electrode 24 formed on a transparent insulative substrate 10. Also in this method, for the purpose of determining uniquely the inclining direction of LC, it is necessary to incline, in advance, the orientation direction of LC to either side, because there exist two inclining directions of LC when LC is completely vertically oriented.

Also, as is the case with the prior art described earlier, it is necessary to divide the inclining direction within pixel to enlarge the view angle, because the view angle characteristic is not good in case of only one LC inclining direction. Thus, as is the case with the prior art described earlier, it is necessary to divide the initial orientation direction within pixel. This complicates the process of making LCD and causes an increase in manufacturing cost.

Figure 3:
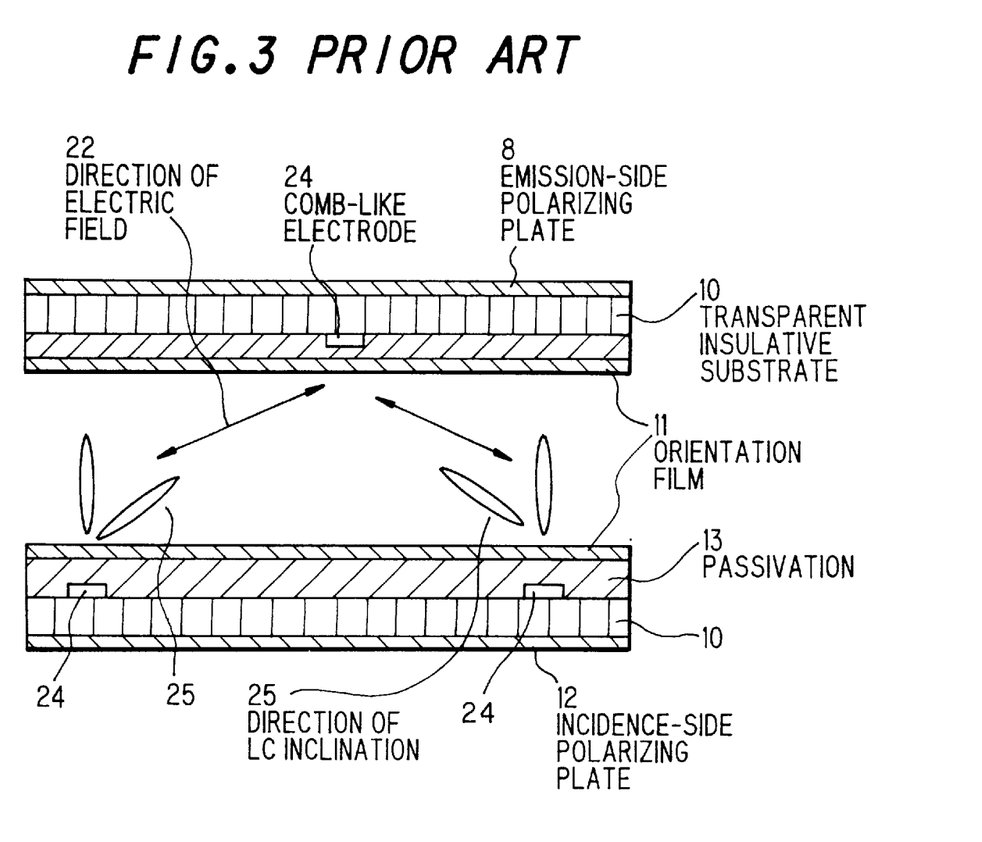
FIG. 3 is another cross sectional view showing still another conventional active matrix liquid-crystal display.

Also, Japanese patent application laid-open No. 56-88179 (1981) discloses a method where comb-like electrodes 24 are formed on both sides of a transparent insulative substrate 10 as shown in FIG. 3. In this method, the direction of electric field occurring when a voltage is applied to the comb-like electrode 24 is oblique. Thus, the oblique electric field 22 generates in two directions and therefore LC oriented vertically is inclined in the two directions. However, by reason that two kinds of electrodes are formed two transparent insulative substrates 10, the precision of overlapping is worse than that of the case that both are formed on a same substrate. Therefore, it is difficult to reduce the dispersion of electrode intervals and high-precision LC cell cannot be produced.

As described above, though some trials for producing high-speed LCD by using the quick response of vertical orientation have been already made, they have the problems, i.e., LC with negative permittivity anisotropy presents poor reliability of material, the complicated process such as orientation division is required, the electrode cannot be formed precisely, etc.

SUMMARY OF THE INVENTION

Accordingly, it is an object of the invention to provide an active matrix liquid-crystal display which has a good view-angle characteristic, excellent response characteristic and reliability.

According to the invention, an active matrix liquid-crystal display, comprises:

two transparent insulative substrates, either one of which comprising a plurality of scanning lines, a plurality of signal lines formed in the direction of intersecting with the plurality of scanning lines, a plurality of switching elements disposed on the intersection points of the plurality of scanning lines and the plurality of signal lines, and pixel electrodes connected to the plurality of switching elements;

a liquid crystal sandwiched between the two transparent insulative substrates;

polarizing plates disposed outside the two transparent insulative substrates; and linear opposing electrodes formed, through insulating film, under the pixel electrodes with a width greater than that of the pixel electrode;

wherein the liquid crystal has positive permittivity anisotropy and is oriented nearly perpendicularly to the transparent insulative substrates, the pixel electrode is composed of single or a plurality of linear electrodes, and the direction of the liquid crystal is controlled by electric field to be formed between the pixel electrode and the opposing electrode.

BRIEF DESCRIPTION OF THE DRAWINGS

The invention will be explained in more detail in conjunction with the appended drawings, wherein:

FIG. 5 is a cross sectional view cut along the line A—A in FIG. 4, FIGS. 6A to 6C are illustrations (cross sections) for explaining the principle of the active matrix liquid-crystal display of the invention, wherein

DESCRIPTION OF THE PREFERRED EMBODIMENTS

The preferred embodiments of the invention will be explained referring to the drawings.

Figure 4:
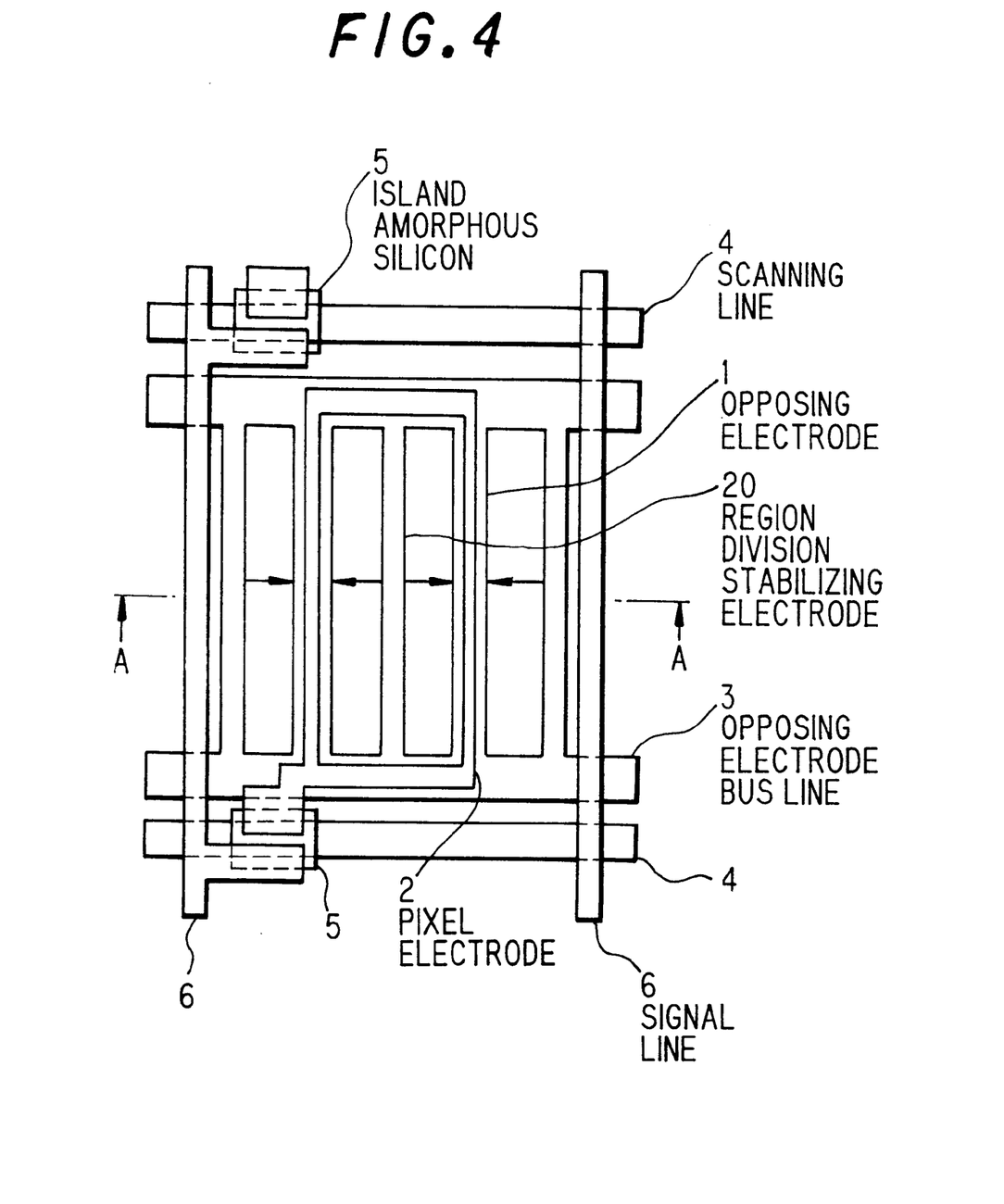
FIG. 4 is a plan view showing one pixel of an active matrix liquid-crystal display in a first preferred embodiment according to the invention.
Figure 5:
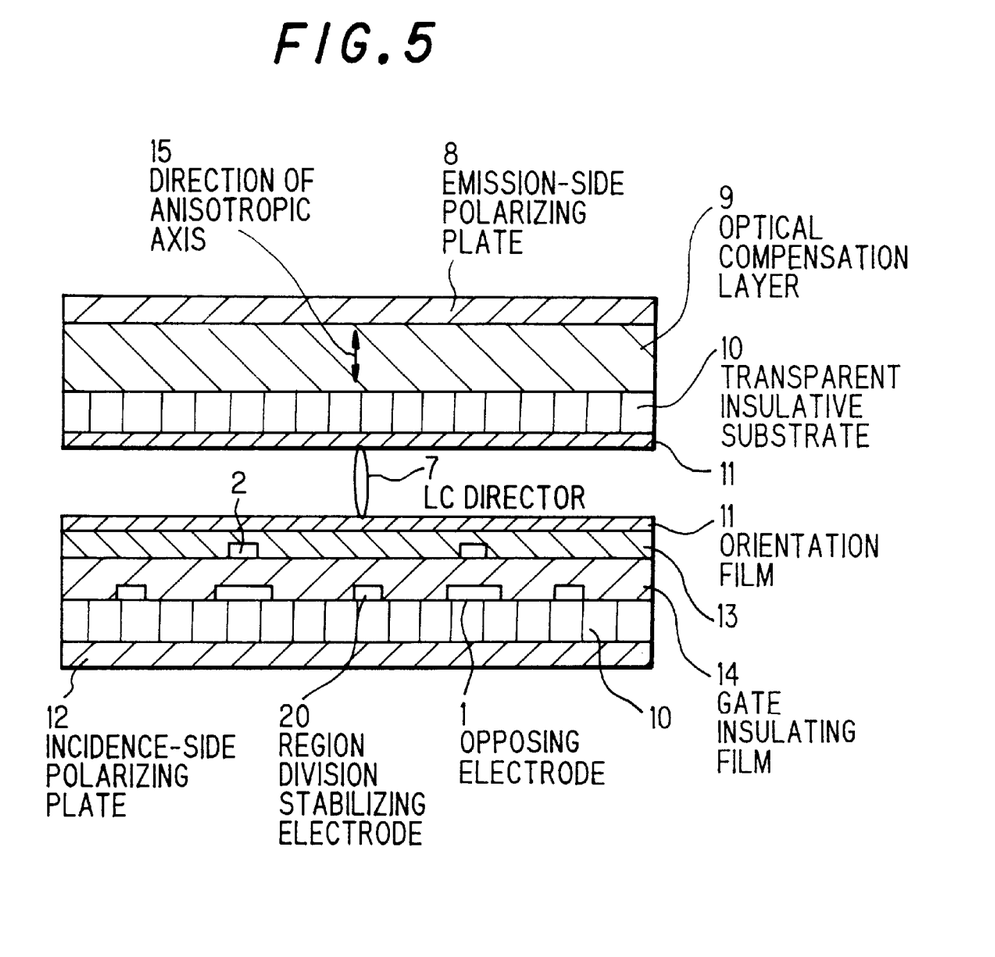

The first preferred embodiment of the invention is shown in FIGS. 4 to 8. FIG. 4 is a plan view showing one pixel of an active matrix liquid-crystal display in the first embodiment of the invention. FIG. 5 is a cross sectional view cut along the line A—A in FIG. 4.

The active matrix liquid-crystal display of the invention is composed of two transparent insulative substrates 10. Disposed on one transparent insulative substrate 10 are several scanning lines 4, several signal lines 6 formed in the direction of intersecting the scanning line 4, and several switching elements (thin-film field-effect transistors) formed near the intersecting point of the scanning line 4 and signal line 6. Also, a pixel electrode 2 connected to each switching element is formed, through gate insulating film 14, above a wider opposing electrode 1 than this.

Namely, each pixel electrode 2 is connected to the thin-film field-effect transistor with an island amorphous silicon 5 as a semiconductor layer and the scanning line 4 as a gate. When the scanning line 4 is turn on, a potential of the signal line 6 can be written. An alternating-current voltage can be applied between this and the opposing electrode 1 which is kept a constant potential by an opposing electrode bus line 3.

Further, between two adjacent pixel electrodes 2, region division stabilizing electrodes 20 extending parallel, with an interval, to the opposing electrode 1 just under the pixel electrode 2 are formed. Also, orientation film 11 is disposed outside passivation film 13 formed on one transparent insulative substrate 10. Also, optical compensation layer 9 is formed on another transparent insulative substrate 10, an emission-side polarizing plate 8 is formed on this optical compensation layer 9, and orientation film 11 is formed on the outer surface of the transparent insulative substrate 10. Also, LC is disposed between both the transparent insulative substrates 10. LC has positive permittivity anisotropy, and is oriented nearly vertically to both the transparent insulative substrates 10.

An incidence-side polarizing plate 12 outside one transparent insulative substrate 10 and the emission-side polarizing plate 8 outside another transparent insulative substrate 10 are disposed in crossed-Nicol state. The polarization axis of the incidence-side polarizing plate 12 is made to be 45° to the longitudinal direction of the pixel electrode 2 shown in FIG. 4.

The absorption axis of the incidence-side polarizing plate 12 is made to be along the rubbing direction, and the absorption axis of the emission-side polarizing plate 8 is made to be perpendicular to the rubbing direction. Thereby, retardation occurring in LC layer when viewing a black display state from an oblique viewpoint can be compensated by the optical compensation layer 9. Therefore, white floatation in black display state from the oblique view can be suppressed, thereby obtaining a good display view characteristic.

Figure 6A:
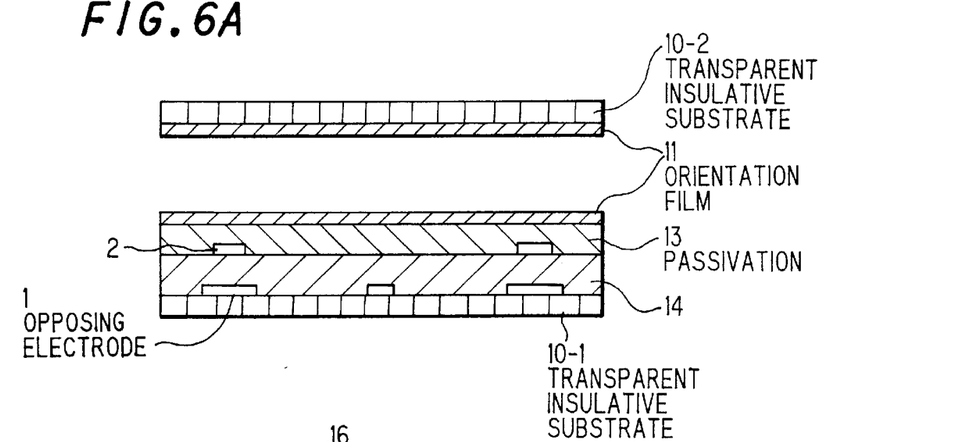
FIG. 6A is a cross sectional view showing one pixel.
Figure 6B:
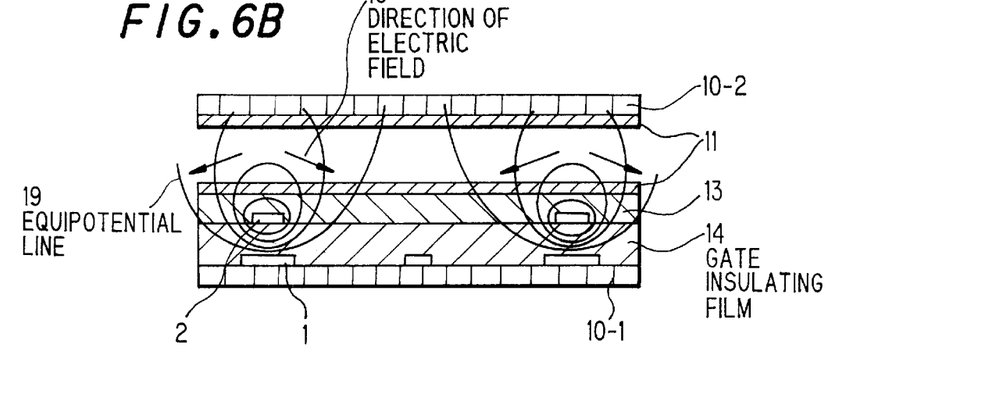
FIG. 6B is a cross sectional view showing equipotential lines occurring when a voltage is applied between a pixel electrode and an opposing electrode.

When a predetermined potential is written in the pixel electrode 2 and a potential difference is generated between the pixel electrode 2 and the opposing electrode 1, equipotential distribution is formed as shown in FIG. 6B. Therefore, as shown in FIG. 6B, a direction of electric field that is perpendicular to the longitudinal direction of pixel electrode 2 and is nearly parallel to the transparent insulative substrate 10 and slightly inclined is given. Thereby, LC director 7, which was initially perpendicular to the transparent insulative substrate 10, is inclined in the direction of arrow.

Thus, when viewing from the front surface, refractive-index anisotropy generates in the direction of inclining LC, i.e., in the direction of 45° to the polarization axis to form the crossed-Nicol. As a result, retardation to the transmitted light of the incidence-side polarizing plate 12 occurs in the LC layer, thereby the permittivity is increased. In general, the inclining angle of LC can be controlled by controlling the applied voltage. Therefore, the amount of transmitted light can be controlled by the voltage.

Figure 6C:
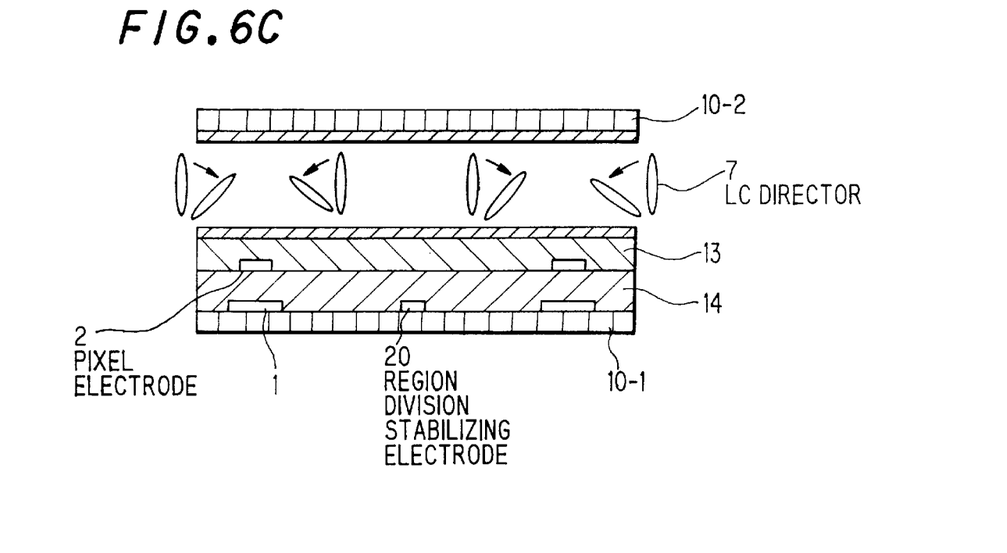
FIG. 6C is a cross sectional view showing the behavior of LC director.

Also, as shown in FIG. 6C, the inclining directions of LC director 7 at both sides of the pixel electrode 2 are separated into two directions that are 180° different from each other. If it inclines in only one direction, when viewing obliquely the transparent insulative substrate 10 from the inclining direction of LC, tone inversion etc. occurs and the view angle is narrowed. In contrast to this, when LC's are inclined in the two directions as in the first embodiment of the invention, due to the two regions compensating each other, the occurrence of tone inversion becomes hard and the view-angle characteristic becomes good.

In the conventional method, to get two directions of inclination like this, a method of conducting the orientation division for each region etc. is used. That causes an increase in the manufacturing process. In the first embodiment of the invention, without causing any increase in the manufacturing process, vertically oriented LC's can be inclined through nearly lateral electric field by only the structure of electrode. Therefore, wide-view and high-speed LC display can be obtained.

Next, the fabrication method of the first embodiment of the invention will be explained, using specific values.

First, an active matrix substrate with such a pixel composition as shown in FIG. 4 will be prepared. Chrome film of 150 nm thick is deposited on the transparent insulative substrate 10, and then it is patterned into a shape to form the linear opposing electrode 1, linear electrode 20 for stabilizing the region division to be connected with the opposing electrode 1, scanning line 4, and opposing electrode bus line 3. Thereafter, silicon nitride film of 400 nm as gate insulating film 14, amorphous silicon film of 350 nm as semiconductor layer, and n-type amorphous silicon film of 30 nm are deposited, and then the amorphous silicon film is patterned into the island shape 5.

Then, chrome film of 150 nm is deposited, and then it is patterned into a shape to form the signal line 6 and pixel electrode 2. Then, 200 nm thick silicon nitride film as the passivation film 13 is deposited, and is patterned to expose the terminal electrode.

The width of pixel electrode 2 is 4 μm, and the opposing electrode 1 disposed under the pixel electrode 2 is 8 μm in width, wider than by 2 μm at both sides thereof. The width of linear electrode 20 for stabilizing the region division, which is connected to the opposing electrode 1, to be formed near the center of two adjacent pixel electrodes 2 is 4 μm.

On the active matrix substrate fabricated as described above and an opposing substrate (transparent insulative substrate 10) composed of a color filter, such orientation films 11 that LC to contact these is perpendicularly oriented are coated respectively. These are bonded, fixing the fringe with a sealing material, filling LC into this, sealing it. The LC cell gap dLC is 5.5 μm. The refractive-index anisotropy ΔnLC of LC filled is 0.075. In this case, the direction of LC director 7 is oriented perpendicularly to the substrate (transparent insulative substrate 10).

Further, the optical compensation layer 9 is formed outside the opposing substrate (transparent insulative substrate 10). The optical compensation layer 9 has negative uniaxial refractive-index anisotropy, where the direction of refractive-index anisotropic axis is made perpendicular to the transparent insulative substrate 10. The product, ΔnF·dF, of the refractive-index anisotropy ΔnF and thickness dF in the optical compensation layer 9 is 165 nm.

Outside this, two polarizing plates 8, 12 are bonded. In this case, the absorption axis of the incidence-side polarizing plate 12 is directed in the direction of 45° to the longitudinal direction of pixel electrode 2, and the absorption axis of the emission-side polarizing plate 8 is directed perpendicularly to this.

The LC display panel fabricated as described above is normally black and presents a good front display characteristic. Also, the view angle characteristic is very good. Also, the response is fast and a good image can be obtained even in movie display.

As described above, the pixel electrode 2 is composed of single or several linear electrodes, the wider linear opposing electrode 1 than the pixel electrode 2 is formed through the gate insulating film 14. By electric field formed between the pixel electrode 2 and the opposing electrode 1, the direction of LC oriented perpendicularly to the transparent insulative substrate 10 is controlled.

Therefore, when applying a potential difference between these, the potential distribution shown by the equipotential lines 19 in FIG. 6B is formed. Thereby, electric field at both sides of pixel electrode 2 is directed slightly inclined under from the horizontal direction as shown in FIG. 6B, the perpendicularly oriented LC directors 7 on both sides of pixel electrode 2 are inclined in different directions. Thus, without adding a special process, the perpendicular orientation can be divided.

Further, by disposing the optical compensation layer 9 with negative uniaxial refractive-index anisotropy in the normal-line direction of the substrate between the other transparent insulative substrate 10 and emission-side polarizing plate 8, the white floatation caused by that LC layer has retardation in black display state, i.e., perpendicular orientation state, can be suppressed.

Figure 7:
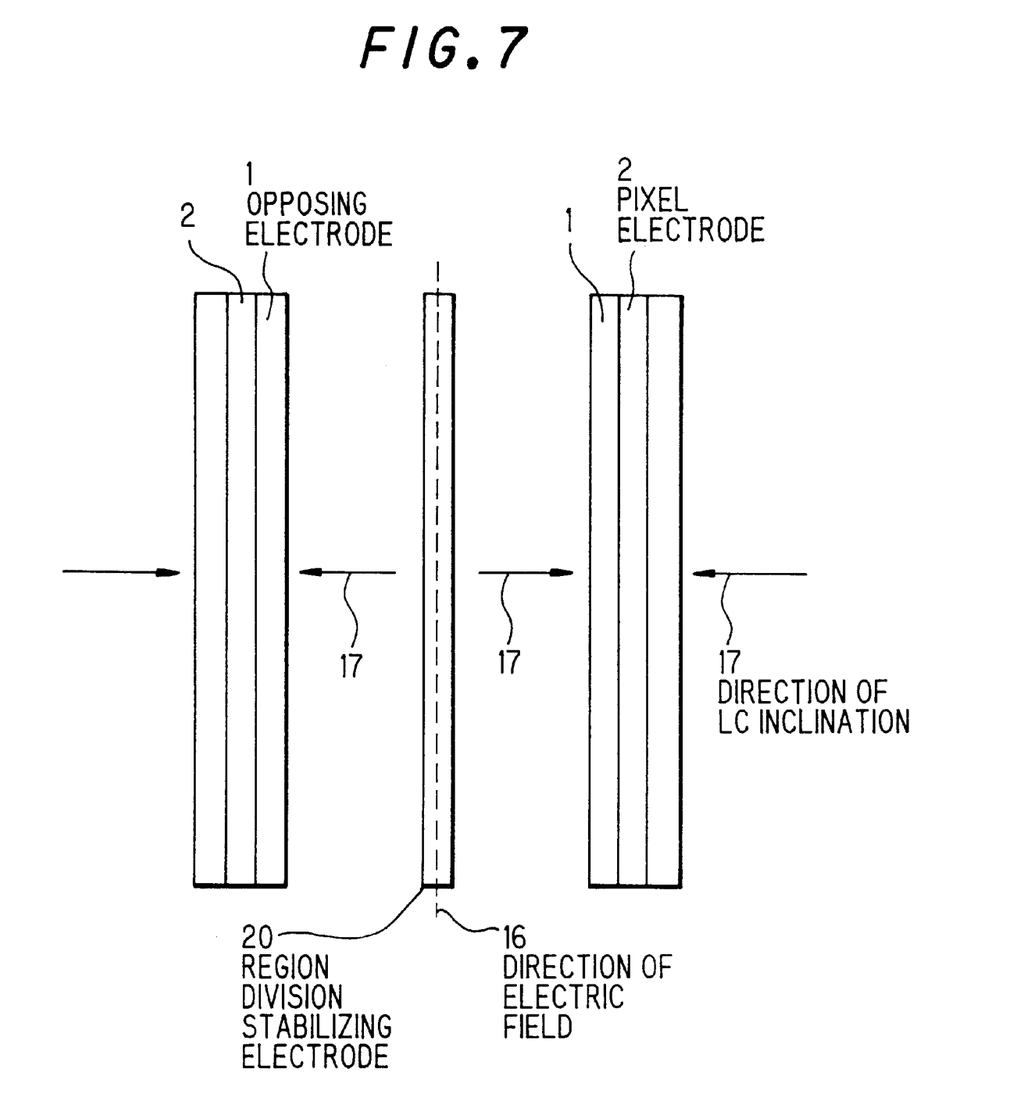
FIG. 7 is an illustration showing the role of a region division stabilizing electrode disposed at the center of two adjacent pixel electrodes.

Also, as shown in FIG. 7, when several pixel electrodes 2 are parallel extended each other, LC's are inclined in different directions 17 on both sides of pixel electrode 2, and therefore a boundary 16 occurs in a region where LC's are inclined in the reverse direction each other near the center thereof. As the case may be, this boundary 16 may be discrimination and may cause the display non-uniformity or residual image. To prevent this, it is effective to form the linear electrode (region division stabilizing electrode) 20 for stabilizing the region division, which is connected to the opposing electrode 1, near the center of two adjacent pixel electrodes 2.

Also, in the first embodiment described above, the optical compensation layer 9 is disposed between the emission-side polarizing plate 8 and the other transparent insulative substrate 10. However, it can be disposed separately between the emission-side polarizing plate 8 and the other transparent insulative substrate 10, and between the incidence-side polarizing plate 12 and one transparent insulative substrate 10, thereby making the sum of both retardation equal to the retardation of LC.

Also, in the first embodiment described above, LC is oriented nearly perpendicular to the substrate. However, by rubbing in the longitudinal direction of the signal line 6, it can have an initial orientation where the LC director 7 is inclined in the longitudinal direction of the signal line 6.

Figure 8:
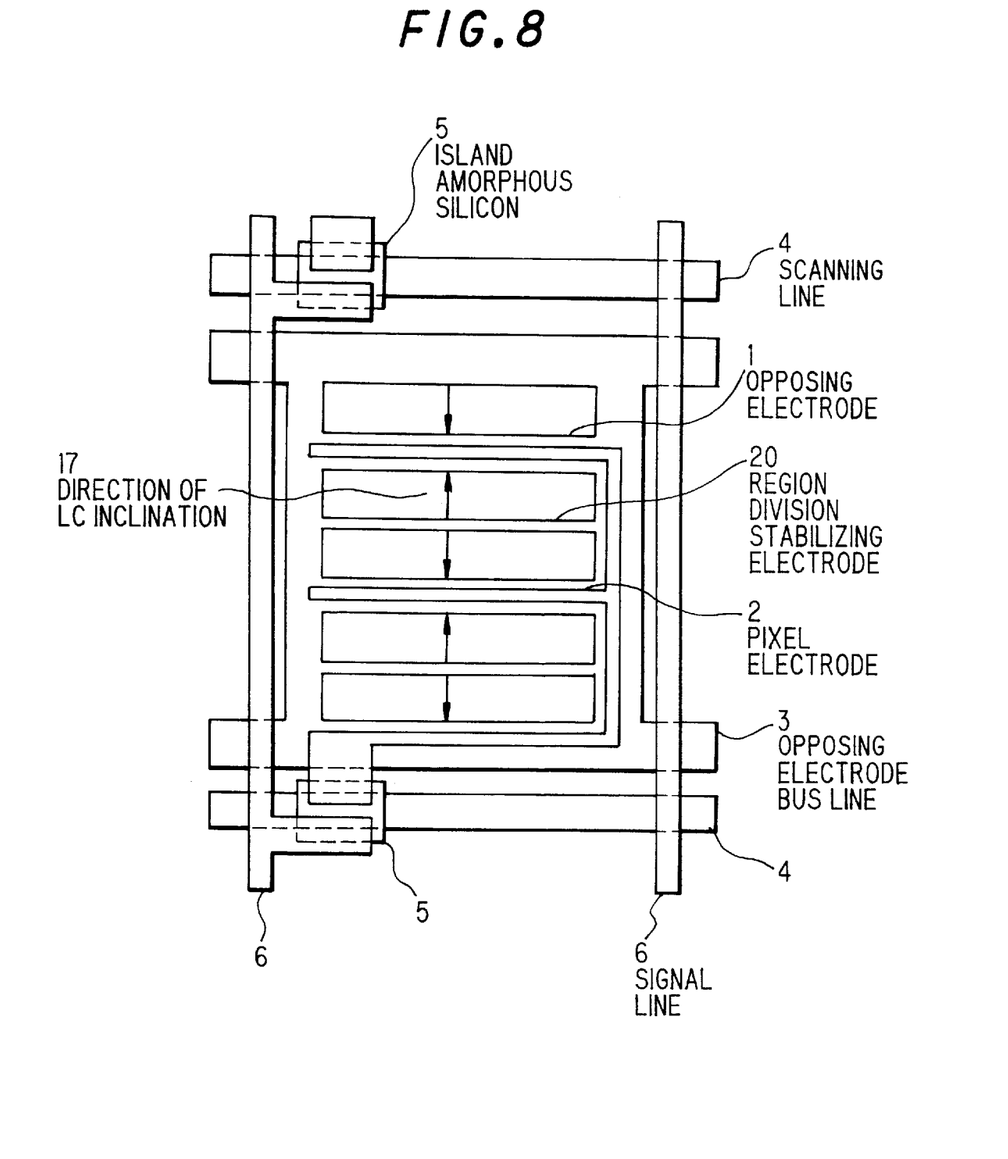
FIG. 8 is a plan view showing one pixel in an alteration of the active matrix liquid-crystal display in the first preferred embodiment according to the invention.

Also, in the first embodiment described above, the extending direction of pixel electrode 2 is made parallel to the signal line 6. However, as shown in FIG. 8, it can be parallel to the scanning line 4. In this case, the fabrication method is similar to that explained above in the first embodiment. Also, the quality of image is on nearly same level.

Figure 9:
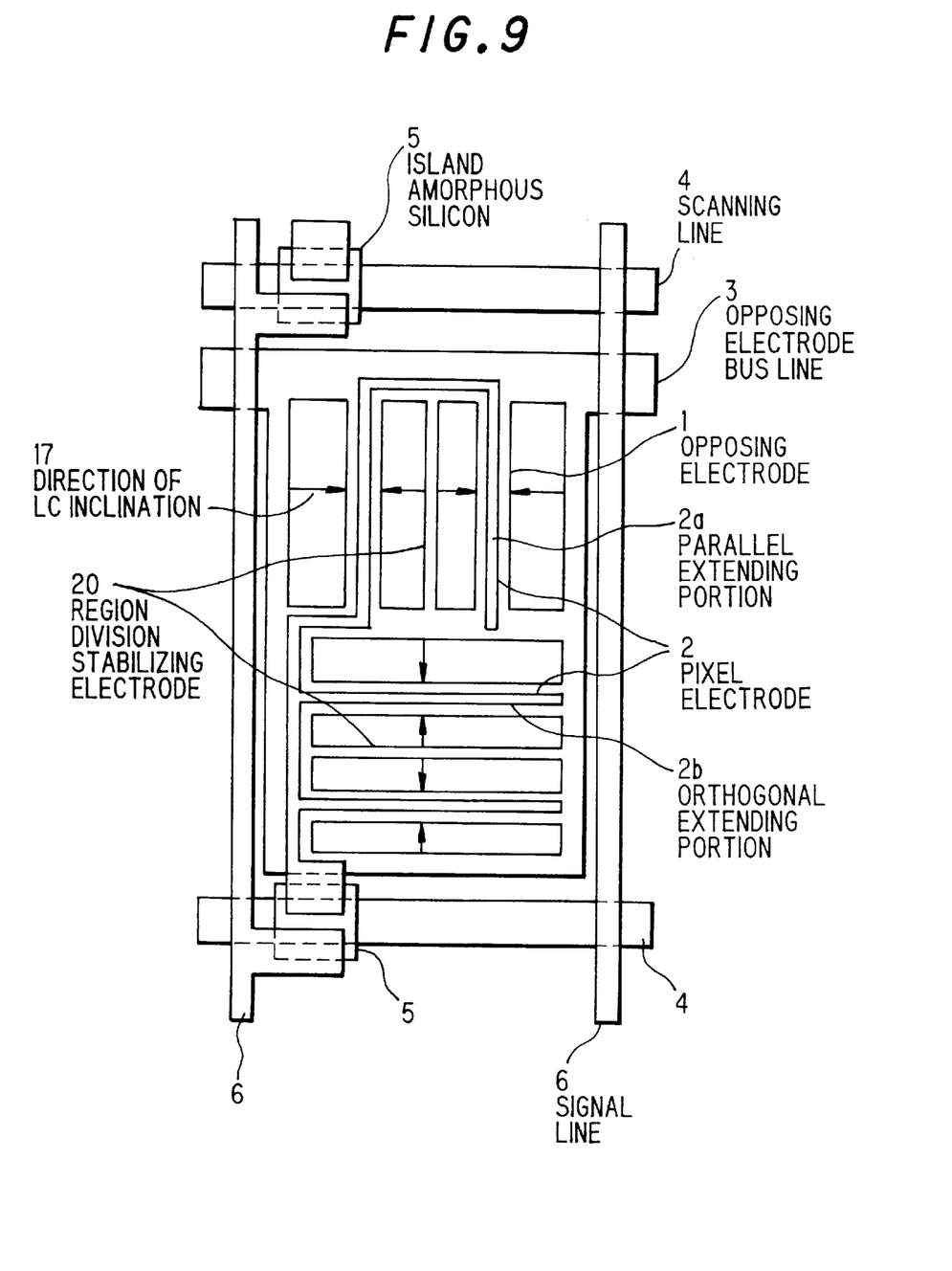
FIG. 9 is a plan view showing one pixel of an active matrix liquid-crystal display in a second preferred embodiment according to the invention.

The second preferred embodiment of the invention is shown in FIG. 9. FIG. 9 is a plan view showing one pixel of an active matrix liquid-crystal display in the second embodiment of the invention.

In the second embodiment of the invention, like the first embodiment, on the transparent insulative substrate 10, the pixel electrode 2 is formed, through the gate insulating film 14, over the wider opposing electrode 1 than this. Each pixel electrode 2 is connected to the thin-film field-effect transistor with an island amorphous silicon 5 as a semiconductor layer and the scanning line 4 as a gate. When the scanning line 4 is turn on, a potential of the signal line 6 can be written. An alternating-current voltage can be applied between this and the opposing electrode 1 which is kept a constant potential by an opposing electrode bus line 3.

Further, between two adjacent pixel electrodes 2, region division stabilizing electrodes 20 extending parallel, with an interval, to the opposing electrode 1 just under the pixel electrode 2 are formed. The pixel electrode 2 has a parallel extending portion 2a extending parallel to the signal line 6 and a orthogonal extending portion 2b (portion extending parallel to the scanning line 4) extending in the orthogonal direction of the parallel extending portion 2a. The other composition is the same as that in the first embodiment described earlier.

In this case, directions where LC's are to be inclined by voltage application are, in total, four, of the pixel electrode 2, two directions perpendicularly to the parallel extending portion 2a extending parallel to the signal line 6 and two directions perpendicularly to the portion extending parallel to the scanning line 4, i.e., the orthogonal extending portion 2b. LC's inclined to these four directions are compensated each other, and therefore the view angle can be better than that in the first embodiment.

Also, the fabrication method of the second embodiment is the same as that of the first embodiment. Thereby, an active matrix substrate with pixel structure shown in FIG. 9 is fabricated. The width of pixel electrode 2 is 4 μm, and the opposing electrode 1 disposed under the pixel electrode 2 is 8 μm in width, wider than by 2 μm at both sides thereof. The width of linear electrode 20 for stabilizing the region division, which is connected to the opposing electrode 1, to be formed near the center of two adjacent pixel electrodes 2 is 4 μm. The fabrication process following below is the same as that in the first embodiment.

The LC display panel fabricated as described above is normally black and presents a good front display characteristic. Also, the view angle characteristic is better than that of the LC display in the first embodiment. Also, the response is fast and a good image can be obtained even in movie display.

Also, in the second embodiment described above, the optical compensation layer 9 is disposed between the emission-side polarizing plate 8 and the other transparent insulative substrate 10. However, it can be disposed separately between the incidence-side polarizing plate 12 and one transparent insulative substrate 10-1. Also, it can be disposed separately between the emission-side polarizing plate 8 and the other transparent insulative substrate 10-2 and between the incidence-side polarizing plate 12 and one transparent insulative substrate 10-1, thereby making the sum of both retardation equal to the retardation of LC.

Advantages of the Invention:

As described above, in the active matrix liquid-crystal display according to the invention, the liquid-crystal layer is perpendicularly oriented and LC's on both sides of pixel electrode are inclined in two directions of 180 different each other by a voltage applied between a wide opposing electrode and a pixel electrode disposed over the opposing electrode. Thus, without adding a special process, the active matrix liquid-crystal display with a good front display characteristic, view-angle characteristic and response characteristic can be obtained.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An active matrix liquid-crystal display, comprising:
two transparent insulative substrates, either one of which comprising a plurality of scanning lines, a plurality of signal lines formed in the direction of intersecting with said plurality of scanning lines, a plurality of switching elements disposed on the intersection points of said plurality of scanning lines and said plurality of signal lines, and pixel electrodes connected to said plurality of switching elements;

a liquid crystal sandwiched between said two transparent insulative substrates;

polarizing plates disposed outside the two transparent insulative substrates; and linear opposing electrodes formed, through insulating film, under said pixel electrodes with a width greater than that of said pixel electrode;

wherein said liquid crystal has positive permittivity anisotropy and is oriented nearly perpendicularly to said transparent insulative substrates, said pixel electrode is composed of single or a plurality of linear electrodes, and the direction of said liquid crystal is controlled by electric field to be formed between said pixel electrode and said opposing electrode.

2. An active matrix liquid-crystal display, according to claim 1, further comprising;

an optical compensation layer disposed between one of said two transparent insulative substrates and said polarizing plate, said optical compensation layer having negative uniaxial refractive-index anisotropy in the normal-line direction of said transparent insulative substrate.

3. An active matrix liquid-crystal display, according to claim 1, further comprising;

another linear electrode disposed parallel to a plurality of said pixel electrodes which are parallel disposed each other, at the center of two adjacent pixel electrodes, and with an interval to said opposing electrode formed under the pixel electrode, said another linear electrode being connected to said opposing electrode.

4. An active matrix liquid-crystal display, according to claim 2, further comprising;

another linear electrode disposed parallel to a plurality of said pixel electrodes which are parallel disposed each other, at the center of two adjacent pixel electrodes, and with an interval to said opposing electrode formed under the pixel electrode, said another linear electrode being connected to said opposing electrode.

5. An active matrix liquid-crystal display, according to claim 1, wherein:

said pixel electrodes are composed of parallel extending portion extending parallel to said signal line and orthogonal extending portion extending in the orthogonal direction of the parallel extending portion.

6. An active matrix liquid-crystal display, according to claim 2, wherein:

said pixel electrodes are composed of parallel extending portion extending parallel to said signal line and orthogonal extending portion extending in the orthogonal direction of the parallel extending portion.

7. An active matrix liquid-crystal display, according to claim 3, wherein:

said pixel electrodes are composed of parallel extending portion extending parallel to said signal line and orthogonal extending portion extending in the orthogonal direction of the parallel extending portion.

8. An active matrix liquid-crystal display, according to claim 4, wherein:

said pixel electrodes are composed of parallel extending portion extending parallel to said signal line and orthogonal extending portion extending in the orthogonal direction of the parallel extending portion.

* * * * *